United States Patent
Kim et al.

(10) Patent No.: US 11,871,366 B2
(45) Date of Patent: Jan. 9, 2024

(54) TEST DEVICE FOR MEASURING SYNCHRONIZATION ERRORS BETWEEN CLUSTERS IN A CELLULAR NETWORK

(71) Applicant: VIAVI SOLUTIONS INC., San Jose, CA (US)

(72) Inventors: Jong-Min Kim, Seoul (KR); Young-Kill Kim, Seoul (KR); Hyuck-In Kwon, Seoul (KR); Yoo-Chul Shin, Seoul (KR); Jae-Gab Lee, Seoul (KR)

(73) Assignee: VIAVI SOLUTIONS INC., Chandler, AZ (US)

( * ) Notice: Subject to any disclaimer, the term of this patent is extended or adjusted under 35 U.S.C. 154(b) by 198 days.

(21) Appl. No.: 17/552,146

(22) Filed: Dec. 15, 2021

(65) Prior Publication Data

US 2023/0189170 A1   Jun. 15, 2023

(51) Int. Cl.
    *H04W 56/00*    (2009.01)
    *G01S 19/13*    (2010.01)
    *H04W 4/021*    (2018.01)
    *H04W 24/08*    (2009.01)

(52) U.S. Cl.
    CPC .......... *H04W 56/001* (2013.01); *G01S 19/13* (2013.01); *H04W 4/021* (2013.01); *H04W 24/08* (2013.01); *H04W 56/006* (2013.01)

(58) Field of Classification Search
    CPC . H04W 56/001; H04W 56/006; H04W 4/021; H04W 24/08; G01S 19/13
    USPC ........................................................ 370/350
    See application file for complete search history.

(56) References Cited

U.S. PATENT DOCUMENTS

| | | | |
|---|---|---|---|
| 2011/0164607 A1 | 7/2011 | Farmer | |
| 2016/0050637 A1* | 2/2016 | Behravan | H04L 5/0048 |
| | | | 370/350 |
| 2019/0215711 A1 | 7/2019 | Tsai et al. | |
| 2021/0036827 A1* | 2/2021 | Huang | H04L 5/0048 |
| 2023/0224738 A1* | 7/2023 | Yerramalli | H04W 64/006 |
| | | | 370/252 |

FOREIGN PATENT DOCUMENTS

| | | | |
|---|---|---|---|
| WO | WO-2022152819 A1 * | 7/2022 | |
| WO | WO-2023014689 A1 * | 2/2023 | |

OTHER PUBLICATIONS

Hadi et al., "5G Time Synchronization: Performance Analysis and Enhancements for Multipath Scenarios", Nov. 17-19, 2021; IEEE; 5 pages (Year: 2021).*

(Continued)

*Primary Examiner* — Mong-Thuy T Tran
(74) *Attorney, Agent, or Firm* — Mannava & Kang, P.C.

(57) ABSTRACT

A test device may be a portable test device that can perform over the air measurements to determine synchronization errors between clusters in a cellular network. The test device can generate a graphical user interface that can show a map of the boundary area between clusters, locations of base stations hi the boundary area, locations where over the air measurements were taken by the test device, an indication of whether cells are in synchronization for each measurement location, and a table of actual measurements and derived parameters pertaining to cell phase synchronization, interference and other performance metrics.

20 Claims, 7 Drawing Sheets

(56) References Cited

OTHER PUBLICATIONS

Calnex Solutions, "Making Over-the-Air sync measurements with Calnex Sentinel", Jan. 1, 2021, pp. 1-14.
Calnexsol article; downloaded Dec. 15, 2021; https://www.calnexsol.com/en/resources/synchronisation-article/1020-measuring-the-network-s-synchronization-performance-over-the-air.
Calnex youtube; downloaded Dec. 15, 2021; https://www.youtube.com/watch?v=PB9qVCER7do.

* cited by examiner

TEST DEVICE FOR MEASURING SYNCHRONIZATION ERRORS BETWEEN CLUSTERS IN A CELLULAR NETWORK

BACKGROUND

A Fifth Generation (5G) mobile standard, referred to as New Radio (NR), calls for higher data transfer speeds, greater numbers of connections, and better coverage, among other improvements. Standardization is ongoing in the 3rd Generation Partnership Project (3GPP), and is anticipated to be in multiple stages. Stage 1 for 5G NR was completed by 3GPP, and is set forth as 3GPP Technical Report (TR) 21.915 v15.0.0 (2019-09), "Technical Specification Group Services and System Aspects (Release 15)." The 5G standard, according to 3GPP, may provide downlink data rates of up to 50 Megabits per second (Mbps) outdoors and up to 1 Gigabit per second (Gbps) indoors. Consequently, increased spectral efficiency, increased signaling efficiencies, and lower latency should be expected when compared to the 3GPP Fourth Generation (4G) standard. An overview of Long Term Evolution (LTE), also known as LTE Release 8, is provided by 3GPP, "Overview of 3GPP Release 8," v0.3.3 (2014-09). Likewise, 4G has evolved from the 3GPP Third Generation (3G) standard. An overview of 3G is provided by 3GPP, "Overview of 3GPP Release 99," v.1.0 (TP-030275) (2003-12). A Radio Access Network (RAN) or a Radio Access Technology (RAT) may be 3G, 4G, 5G, or a combination thereof.

Timing and synchronization are interrelated requirements for wireless network performance. Timing is based on the establishment of a precise, standardized time value that must be disseminated throughout the wireless network. The closely related concept of synchronization refers to the coordinated, precise cadence of network activities that can only be completed successfully with this common time reference.

Timing and synchronization standards for mobile networks prevent messages from interfering with one another and enable smooth cell-to-cell transfers. The increased stringency of timing and synchronization requirements for 5G is being driven by exponentially faster speeds, lower latency, and increased densification. The ongoing migration to packet-based transport and time division duplex (TDD) technologies also demand precision and versatility from timing and synchronization test solutions.

Synchronization definition and procedures vary, depending on the communication system. Carrier and timing accuracy requirements become more stringent for TDD versus Frequency Division Duplex (FDD) 5G. For each use case, the synchronization, type, requirements, and impact of non-compliance on performance also varies substantially. When 5G network nodes are not in sync, received signals cannot be demodulated properly. High bit error rate (BER), delay, and jitter that compromise customer experience can result. To address this, synchronization requirements have now been established by multiple standards bodies including the 3GPP and ITU-T. For example, Absolute time error between a grand master time reference and any node is limited to an exceptionally short 1.5 microseconds (µs) for LTE/5G TDD. This includes 1.1 µs of absolute time error to the access point and 0.4 µs over the fronthaul link to the radio.

TDD cell phase synchronization is the maximum deviation hi frame start timing between any pair of cells on the same frequency that have overlapping coverage areas. The deviation in frame start timing between cells must be below a maximum value specified as cell phase synchronization accuracy in the 3GPP; i.e., 3 µs according to 3GPP 38.133. Failure to maintain synchronization within this standard can result in network Interference, reduced capacity, and poor performance.

BRIEF DESCRIPTION OF THE DRAWINGS

Features of the present disclosure are illustrated by way of examples shown in the following figures. In the following figures, like numerals indicate like elements, in which.

DETAILED DESCRIPTION

Figure 1:
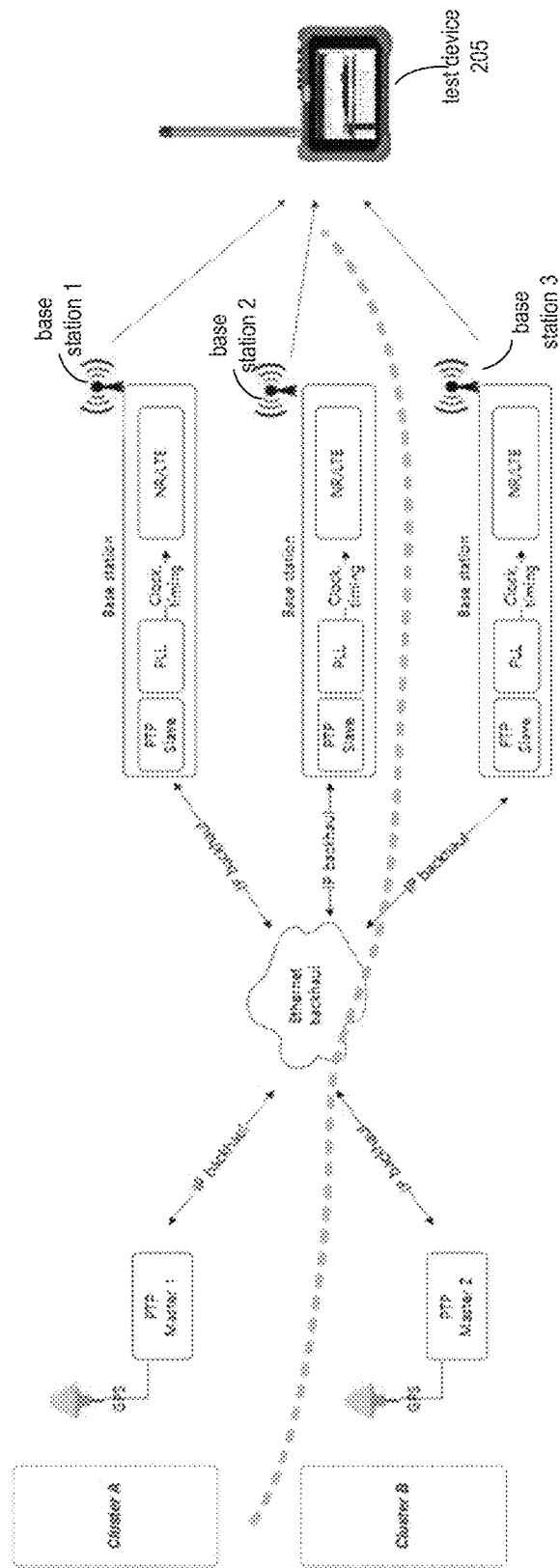
FIG. 1 is an environment for measuring interference between clusters with a test device, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

In a cellular network, total area is subdivided into smaller areas called cells. Each cell can cover a limited number of mobile subscribers within its boundaries. A cell can be defined as an area of radio coverage from one base transceiver station antenna system. It is the smallest building block in a mobile network and a cell can be represented by a hexagon. Groups of frequencies can be placed together into patterns of cells called clusters. A cluster is a group of cells. In an example, a cluster may be a group of cells in which all available frequencies have been used once and only once.

A problem that can arise between neighboring clusters in a cellular network is Signal to Interference and Noise Ratio (SINR). SINR measures signal quality, such as the strength of the wanted signal compared to unwanted interference and noise. SINR can be caused by TDD cell phase synchronization between cells in neighboring clusters being out of synchronization (sync). If two neighboring clusters are not in sync with each other, a potential SINR issue in a boundary area between overlapping cells of the neighboring clusters is likely to be present. In an example scenario, a network operator may have multiple cells in neighboring clusters. Cross-link interference can occur between overlapping cells in the neighboring clusters causing SINR in the boundary area due to the cells being out of sync. As a result, customers may experience degraded service.

Commonly, testing for synchronization is done within a cluster to determine if slave clocks are in sync with a grandmaster clock of the cluster. However, this testing only detects whether clocks within a cluster are in sync, but it does not test whether clocks in different clusters are out of sync. According to an example of the present disclosure, a test device is provided that can test whether cells in neighboring clusters are out of sync based on over-the-air (OTA) measurements. The test device may be a portable test device that can take OTA measurements in the boundary area between cells. In an example, the test device can test whether cells in neighboring clusters have a TDD cell phase synchronization that exceeds a threshold, such as the 3 μs threshold set by 3GPP 38.133. Furthermore, according to an example of the present disclosure, the test device includes an improved graphical user interface (GUI) that can show a map of the boundary area between clusters, locations of base stations in the boundary area, locations where OTA measurements were taken by the test device, an indication of whether cells are in sync for each measurement location, and a table of actual measurements and derived parameters pertaining to cell phase synchronization, SINR and other performance metrics. A technician viewing the GUI can quickly identify locations where cells in neighboring clusters are out of sync so timing for these cells can be adjusted so they are in synch to avoid SINR issues. Additionally, the test device can generate a GUI that instructs, via a map, a technician or other type of user using the test device of candidate measurement locations within the boundary area for taking measurements.

FIG. 1 shows a block diagram of an example environment 100 where test device 205 can test whether cells in neighboring clusters, shown as cluster A and cluster B, are out of synchronization based on OTA measurements taken by test device 205. In this example, cluster A includes base stations 1 and 2, and cluster B includes base station 3. The clusters may have more base stations than shown.

In an example, the base stations 1-3 have slave clocks, shown as PTP slaves, that are each synchronized to a master clock of their respective cluster, shown as PTP master 1 and PTP master 2, which may be in the backhaul. The clock signal output by PTP master 1 and PTP master 2 provides a reference time and phase synchronization signal traceable to a recognized time standard, e.g., Coordinated Universal Time (UTC), for other clocks, e.g., PTP slaves, within the cluster. Securing stringent time/phase is a key point for providing better Quality-of-Services (QoS) in LTE ang NR networks.

Global Navigation Satellite System (GNSS) is a satellite constellation that provides Positioning, Navigation, and Timing (PNT) services on a global or regional basis. Example GNSS receiver systems include: the Global Positioning System (GPS), a North American satellite-based radionavigation system owned by the United States government and operated by the United States Space Force; the globalnaya navigatsionnaya sputnikovaya sistema, also known as the "Global Navigation Satellite System" (GLONASS), a global radionavigation satellite service provided by the Russian Federal Space Agency; the BeiDou Navigation Satellite System (BUS), operated by the China National Space Administration, and Galileo, operated by the European Global Navigation Satellite Systems Agency. A GNSS receiver may calculate and output a One Pulse Per Second (1PPS) signal which may be synchronized to UTC to provide timing for control of a 3G, 4G, or 5G RAN, including open radio access networks (O-RAN). For example, PTP master 1 and PTP master 2 may include GNSS receivers that can generate a 1 PPS signal for timing control that is disseminated to slaves in the fronthaul.

In a GNSS system, each satellite has an atomic clock, accurate to one second in 300 million years, which is synchronized to a master atomic clock located at an Earth base station. GNSS satellites transmit radio signals providing satellite position and timing information. For example, a GPS satellite transmits four signals for civilian use, known as L1 C/A (1575.42 megahertz (MHz)), L2C (1227.60 MHz), L5 (1176 MHz), and L1C (1575 MHz). Data is transmitted using binary phase-shift keying (BPSK) and code division multiple access (CDMA). Ranging codes and navigation messages are modulated onto the carrier wave. A GNSS receiver receives GNSS signals, including embedded time information based on the atomic clock, from a GNSS satellite. The GNSS receiver decodes the received GNSS signals to determine the embedded time information and calculates and outputs a corresponding 1PPS signal based on the embedded time information. The 1PPS signal is synchronized to Coordinated Universal Time (UTC). In an example, the 1PPS signal is pulled high at the start of each UTC second. The 1PPS signal may be an electrical signal that has a width of approximately one second and a sharply rising or abruptly falling edge that accurately repeats once per second.

There are generally two timing protocols that may utilize a 1PPS signal, Network Time Protocol (NTP) and Precision Time Protocol (PTP). NTP is a networking protocol for clock synchronization between computer systems over packet-switched, variable-latency data networks. NTP is an open source project coordinated by the Network Time Foundation and is intended to synchronize participating computers to within a few milliseconds of UTC. UTC is defined by International Telecommunication Union (ITU) Recommendation (ITU-R) for Time signals and frequency standards emissions (TF) TF.460-6, "Standard-frequency and time-signal emissions," (1970-2002) (incorporated by reference into ITU Radio Regulations), and is based on International Atomic Time (TAI) with leap seconds added at irregular intervals to compensate for the slowing of the Earth's rotation. NTP is generally used to synchronize system clocks in general-purpose Unix, Windows, and Virtual Machine (VM) workstations and servers that require less precision that PTP.

PTP is defined by the Institute of Electrical and Electronics Engineers (IEEE) 1588 Precision Time Protocol, version 2, IEEE, March 2008, and updated as IEEE 1588-2019, IEEE, November 2019. PTP is generally used to synchronize device clocks in special-purpose measurement networks, such as radio access networks (RANs), which is shown in FIG. 1. A PTP system may include clocks in a master-slave configuration, with a root timing reference device referred to as a grandmaster clock, e.g., PTP master 1 and 2. PTP devices may be connected to dedicated, high-speed Ethernet Local Area Network segments interconnected by switches. PTP messages may use a protocol known as User Datagram Protocol (UDP) over Internet Protocol (IP) for transport, PTP messages may be sent unicast or multicast.

A Grandmaster clock (GM), also known as a Grandmaster, an Edge Grandmaster, or an Edge Grandmaster Clock, is a primary reference source of time within a PTP sub-domain, such as a RAN architecture. PTP master 1 and PTP master 2 are GMs in the example shown in FIG. 1. The GM is essential for providing standard time information to other clocks across the network, such as in PTP messages. A GM receives UTC-based time information from an external time reference, such as a GNSS satellite, The GM derives precision time from the GNSS signals. The GM then distributes the precision time to other clocks in the network. The GM may have a high-precision time source, which may be synchronized to a 1PPS signal output from a GNSS receiver of the GM to generate a GM clock signal. The GM outputs PTP messages to a connected network so devices in the connected network can synchronize to the GM clock signal. A Boundary Clock (BC), e.g., PTP slaves, may also be present in a RAN architecture. A BC may be considered a slave clock, run PTP, and be synchronized to the GM with PTP messages.

Hence, accurate PTP messages output by PTP master 1 and 2 propagate through the network, e.g., Ethernet backhaul, and carry the 1PPS signal output from the PTP masters. PTP master 1 and PTP master 2 may communicate with slave clocks in their cluster using PTP Over Ethernet according to ITU-T standard G.8275.1, "Precision time protocol telecom profile for time synchronization," to provide synchronization. The PTP slaves that operate as BCs receive the PTP messages and synchronize to the respective 1PPS signal in the PTP messages sent from the PTP masters.

For TDD networks, such as 5G NR TDD and LTE TDD, network operators must prevent simultaneous UL and DL transmission occurrence. That is at any given moment in time, either all transmission occurrence is in DL or all is in UL, adopting a single frame structure for all transmission occurrence involved as well as synchronizing the beginning of frames. When user equipment (UE), such as cellular phones or other types of user equipment, connect to base stations 1-3, the UE executes a hand-shake procedure to synchronize transmission with the base stations 1-3 based on the PTP slave docks. If the PTP slaves are not synchronized to within stated tolerances, then cross link interference in transmission occurrences between the UE and base stations 1-3 may result. For example, DL spectrum may leak onto the adjacent channels, and any DL spectral imperfection may thus create interference in the UL signal of adjacent cells, especially when the two cells are in neighboring dusters.

According to an example of the present disclosure, the test device 205 can take OTA measurements from the base stations 1-3 and calculate frame start times for transmission occurrences between the test device 205 and each of the base stations. The test device 205 can determine if frame start times are out of synch and determine whether any differences in frame start times for neighboring dusters are outside a predetermined tolerance, such as 3 µs for LTE/5G TDD. Also, as is further explained below, the test device 205 can take the OTA measurements at different locations within a boundary between neighboring dusters, such as dusters A and B, and for each location generate points on a map that indicate where SINR issues may occur.

Figure 2:
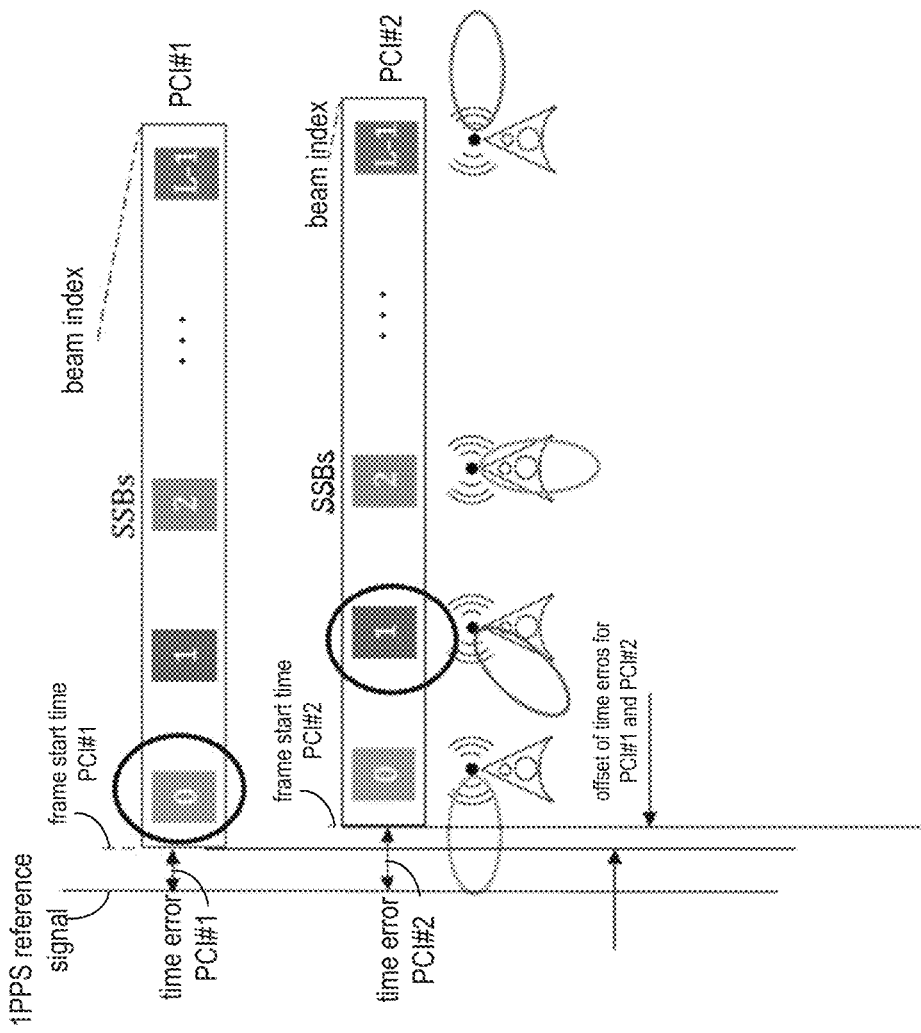
FIG. 2 is a timing diagram for determining timing errors between clusters, according to an example of the present disclosure.

FIG. 2 shows a timing diagram to illustrate measurements and frame start differences that can be determined by the test device 205 based on OTA measurements. FIG. 2 shows three signals. A first signal is a 1PPS reference signal synchronized to UTC. For example, the test device 205 includes a GNSS receiver that can receive UTC-based time information from a GNSS satellite, and generates a 1PPS reference signal synchronized to UTC. This is similar to the GM discussed above. The other two signals are frame start signals for two different cells serviced by two base stations, such as base stations 1 and 2 shown in FIG. 1. Although frame start signals are shown for two base stations, the frame start signals may be determined for transmissions for each of the base stations 1-3 by the test device 205. Frame start is the time of transmission of a beginning of a frame. The frame start signals should be determined for overlapping cells in neighboring clusters, such as base station 1 and base station 3, to determine whether the dusters are out of sync.

To determine the frame start of a frame transmitted from a base station, the test device 205 performs a cell search. Cell search is a known procedure for a UE to acquire time and frequency synchronization information for transmission in a cell, and to detect Physical layer Cell ID (PCI) of the cell. The test device 205 performs the cell search to detect the PCI of the cell and to determine the frame start time of a frame transmitted from a base station in the cell to the test device 205. In this example, PCI#1 is the cell ID for the cell of base station 1 and PCI#2 is the cell ID of the cell for base station 2.

To perform the cell search, the test device 205 decodes synchronization signals (SS) transmitted from the base station. SS are broadcast in blocks every 5 ms (half frame) over the 62 central subcarriers, no matter what the carrier bandwidth is. There are two types of SS: Primary Synchronization Signals (PSS) and Secondary Synchronization Signals (SSS). PSS and SSS together contain the PCI of the cell. SSS help identify the PCI group while PSS help identify the position inside the group. For 5G NR, SS are used firstly to synchronize the gNodeB and UE in both time and frequency domain. PSS and SSS occupy 127 Resource Elements and are broadcast together with the Physical Broadcast Channel (PBCH) in a 4-symbol block called SS/PBCH or Synchronization Signal Block (SSB). PBCH itself uses 20 Resource Blocks (240 subcarriers) in two symbols no matter the bandwidth or subcarrier spacing is. SSB blocks may use different subcarrier spacings (SOS): 15 kHz and 30 kHz for frequency range 1 (FR1), and 120 kHz and 240 kHz for FR2. SSBs are broadcast in bursts or groups of blocks, referred to as SSB bursts, that depend on the number of antenna beams, A single SSB is assigned to a single antenna beam. SSB bursts in 5G are broadcast in periods of 5, 10, 20, 40, 80 or 160 milliseconds (ms) depending on service's needs. This is a difference compared with LTE which broadcasts SSB bursts every 5 ms.

The base station periodically transmits an SSB burst, and the SSB and beam index has a fixed location in the SSB burst. The frame start can be calculated from the SSB and beam index as stipulated in the 3GPP standard. The frame start of a frame for each of PCI#1 and PCI#2 is represented by the left edge of the SS Bursts shown in FIG. 2. The frame start is the transmission time of the beginning of the frame. For example, for 5G NR, the base station, e.g., gnodeB, periodically transmits an SSB burst that carries multiple SSBs. Each SSB is transmitted via a specific beam with pre-specified interval and direction. The SSBs in a half frame are indexed in an ascending order in time from 0 to L-1, as shown, From the beam index, the frame start can be determined based on NR frame structure that is specified in 3GPP specification (38,211) as is known in the art.

Also, the frame start can be adjusted for signal propagation time for a frame transmitted over the aft from the base station to the test device 205. For example, the distance between the test device 205 and the base station is determined. This can be determined from a known location of the base station and a location of the test device 205 when the measurements are performed, i.e., the measurement location. The measurement location may be determined from a GNSS (e.g., GPS) receiver of the test device 205. The propagation time of the signal carrying the frame, which is transmitted from the base station to the test device 205, is determined from the distance between the measurement location and the base station transmitting the frame. The propagation time is subtracted from the frame start time determined based on the received SSs to calculate the frame start time that is adjusted for the propagation time.

The test device 205 further calculates the difference between the frame start and the 1PPS reference signal for PC#1, which is labeled as time error PC#1. Also, the test device 205 calculates the difference between the frame start and the 1PPS reference signal for PC#2, which is labeled as time error PC#2. Then, the test device 205 can calculate the difference between the time errors for PC#1 and PC#2. This difference is a sync error and should be less than or equal to 3 μs to comply with the 3GPP stated cell phase synchronization tolerance.

When using the test device 205, the technician can make measurements at different geographic locations in a boundary area between clusters A and B to determine whether the clusters are out of sync. The test device 205 can determine a sync error and a time error as discussed above with respect to the 1PPS reference signal. The time error is the offset from the 1PPS reference signal generated by the GPS receiver of the test device 205. For example, the time error is the difference between the frame start time and the time of the rising edge or the falling edge of the 1PPS reference signal. The test device 205 also determines the sync error. The sync error can be based on the time error differences from a primary PCI and a secondary PCI. For example, measurements are taken for multiple cells supported by multiple base stations. One of the base stations is set as the primary PCI. For example, base station 1 for PCI#1 is set as the primary PCI if it has the greatest signal strength when compared to signals being received from other base stations at a particular location. Alternatively, a PCI may be set as the primary PCI manually or based on other criteria. Assuming PCI#1 is the primary PCI, the sync error is the difference between the time error of PCI#1 and PCI#2. If this difference is greater than a predetermined threshold, then the cells are out of sync, and the measurements may be flagged as such by the test device 205. This is further described below.

Figure 3:
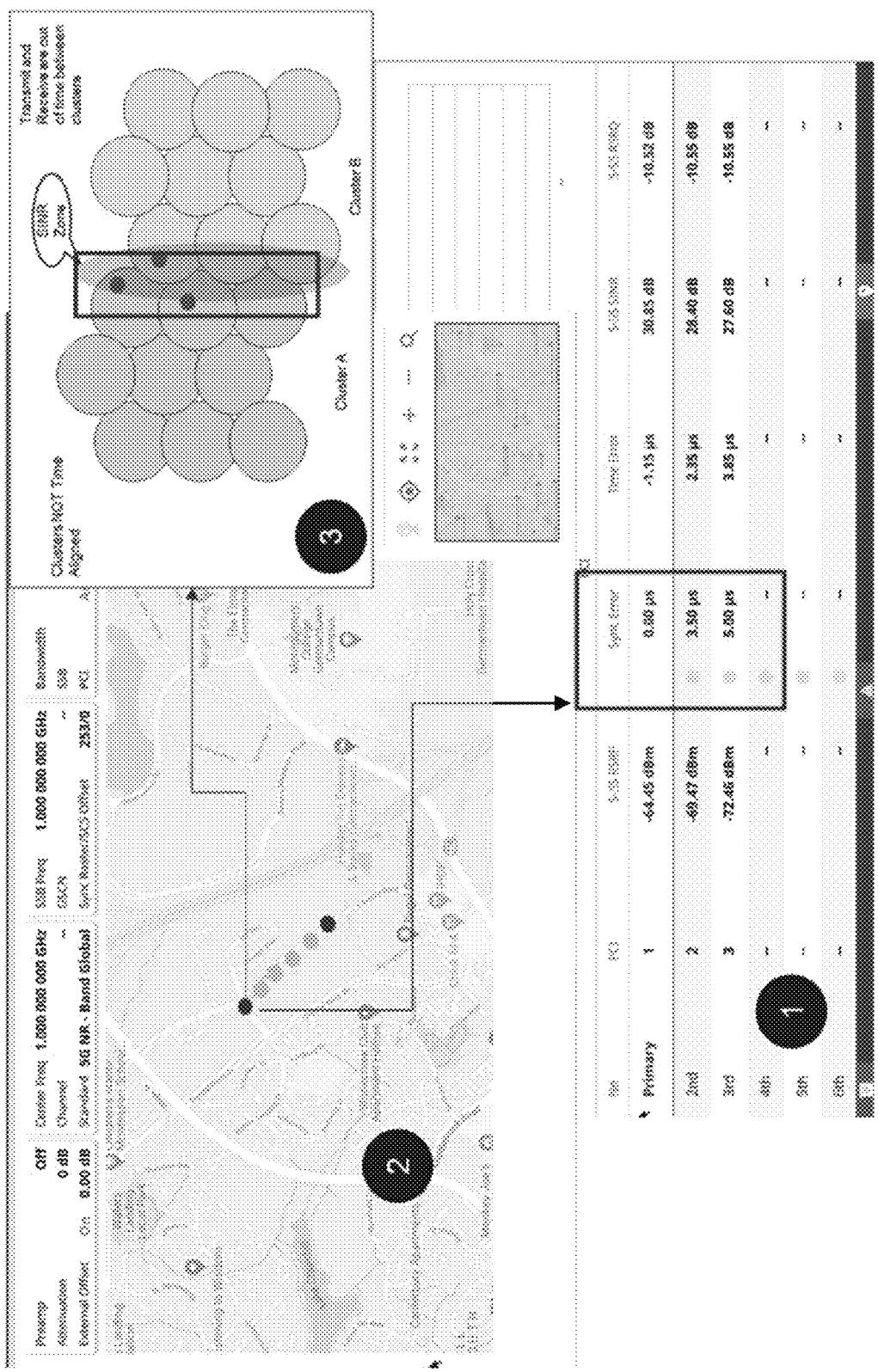
FIG. 3 is a graphic user interface generated by the test device, according to an example of the present disclosure.

FIG. 3 shows an example GUI generated by the test device 205. The GUI may include three sections shown as 1-3. In section 2, a map is shown with measurement locations. The measurement locations are different geographic locations which may be in a boundary area between clusters. For example, a technician using the test device 205 may walk a path between clusters A and B, and take measurements at different locations along the path to determine whether the dusters are out of sync. In an example, the test device 205 may generate a candidate measurement location GUI to guide the technician to potential measurement points along a path in the boundary area.

In section 2, each of the measurement locations is shown as a dot on the map, and the dots may be color coded or provided with another visual indicator that indicates whether measurements performed at each location are indicative of whether the clusters are out of sync. In an example, the dots may be shown as green if the measurements are indicative that the dusters are in sync and may be shown as red if the measurements are indicative the dusters are out of sync.

Section 1 shows a table of measurements determined for each measurement location. Measurements are shown only for one measurement example in section 1, but the table can be populated with measurements for each measurement location. The table includes the sync error and time error determined by the test device 205 for the particular measurement location. For example, for location 1, the sync error is shown. Measurements are taken for multiple cells and base stations at each measurement location. In this example, there are measurements for cells, i.e., cell IDs PCI#1, PCI#2 and PCI#3, that correspond to base stations 1-3 respectively of FIG. 1. PCI#1 and PCI#2 are in cluster A, and PCI#3 is in cluster B. The PCIs are determined from SSs. One of the PCIs is selected as a primary PCI, which in this case is PCI#1, and the sync error is determined using PCI#1 as the primary PCI. As is shown, the sync error between PCI#1 and PCI#3 is greater than 3 μs, so the clusters are out of sync. Thus, the dot for this measurement location may be shown in red. Additionally, the sync error between PCI#1 and PCI#2 may be greater than a predetermined threshold, so the timing within the cluster A may also be out of sync.

Also, the time error is shown in the table along with other measurements taken by the test device 205 at each measurement location. By way of example, the other measurements may include, for 5G, SS-RSRP which stands for Synchronization Signal reference signal received power. It is defined as the linear average over the power contributions (in Watt) of the resource elements that carry synchronization signals. The measurement time resource(s) for SS-RSRP are confined within SS/PBCH Block Measurement Time Configuration (SMTC) window duration. PBCH stands for Physical Broadcast Channel.

SS-RSRQ is another measurement and it stands for Secondary synchronization Signal Reference Signal Received Quality. It is defined as the ratio of N×SS-RSRP/NR carrier RSSI, where N is the number of resource blocks in the NR carrier RSSI measurement bandwidth. RSSI stands for Received Signal Strength Indicator. The measurements in the numerator and denominator shah be made over the same set of resource blocks.

SS-SINR is another measurement and it stands for SS signal-to-noise and interference ratio. It is defined as the linear average over the power contribution (in Watt) of the resource elements carrying SSS divided by the linear average of the noise and interference power contribution (in Watt) over the resource elements carrying SSS within the same frequency bandwidth.

These measurements may be useful to the technician to identify, diagnose and remediate problems associated with interference or other technical issues. RSRP, RSRQ, and SINR are radio measurements often used for LTE and 5G networks for determining coverage, quality and therefore service level, Section 3 shows base station information. The cells for clusters A and B are shown. Also, the location of base stations 1-3 within the clusters are shown. Also shown is SINR zone which is a boundary zone between the clusters. The boundary zone may be an area of predetermined size that overlaps clusters A and B. In this example, the measurements taken at measurement location 1 indicate the clusters are out of sync. Accordingly, the test device 205 represents this out of sync state by indicating the clusters are not time aligned in section 3 of the GUI. Also, an arrow, such as a red arrow, is shown connecting measurement location 1 to the corresponding sync error measurements in the table which may be outlined in a red box. Also, the dot representing measurement location may be shown in red. In addition, the red arrow connects measurement location 1 in section 2 to the clusters shown in section 3 to indicate that the clusters are out of sync.

The GUI shown in FIG. 3 has three sections. One or more of the sections may be shown in separate GUIs. The GUIs are generated and displayed on a display of the test device 205.

Figure 4:
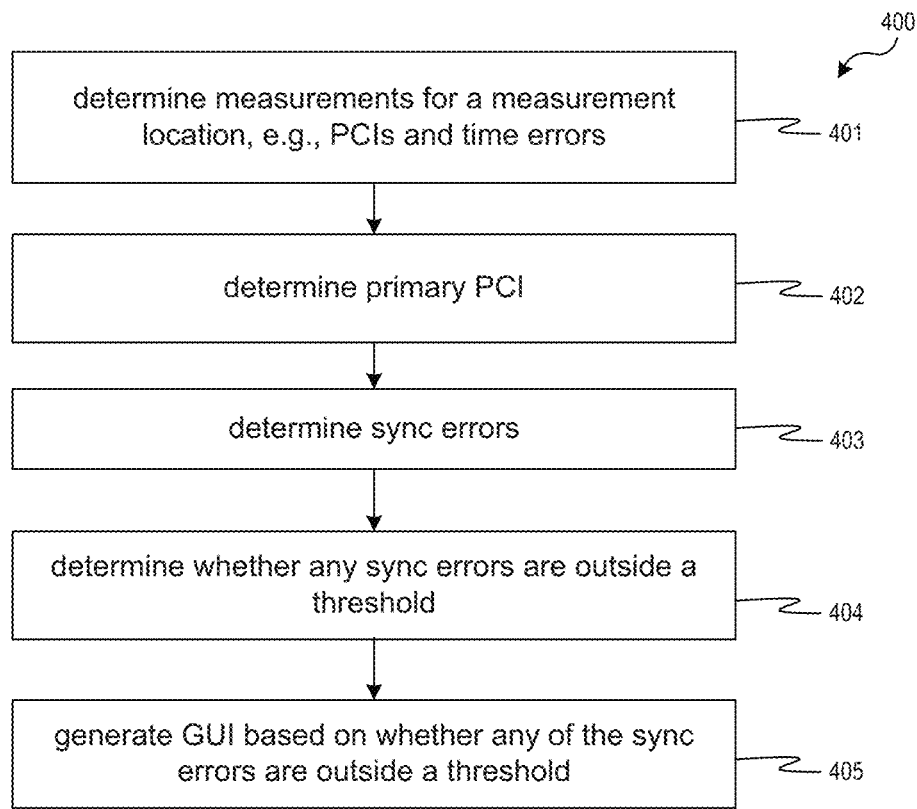
FIGS. 4-5 are methods performable by the test device, according to examples of the present disclosure.

FIG. 4 shows an example flow chart of a method 400 that may be performed by the test device 205. At 401, the test device 205 determines measurements for a given measurement location. The measurement location may be in a predetermined boundary zone, e.g., SINR zone, between neighboring clusters. The measurements may include determination of PCIS from synchronization signals received from base stations. For example, PCI#1, PCI#2 and PCI#3 may be determined from sync signals received from base stations 1-3 while at measurement location 1, The measurements also include time error, which is an offset from the 1PPS reference signal. One or more of the measurements are OTA measurements, such as measurements that pertain to SS transmitted from the base stations to the test device 205.

At 402, the test device 205 determines a primary PCI. In an example, the test device 205 selects the PCI with the greatest signal strength, but the primary PCI may be selected based on other criteria or may be selected based on user input.

At 403, the test device 205 determines the sync errors, which is the relative time error difference between the primary PCI and other PCIs for which measurements are taken, For example, assume PCI#1 is selected as the primary PCI. The difference between the time errors of PCI#1 and PC#2 is determined. Also, the difference between the time errors of PCI#1 and PC#3 is determined. Both differences are shown in the table in FIG. 3 as sync errors for PCI#2 and PCI#3.

At 404, the test device 205 determines whether any of the sync errors are outside a threshold. For example, to determine whether the clusters A and B are out of sync, the test device 205 compares whether the sync error for PCI#3 is greater than a threshold set by the 3GPP for this determination, e.g., 3 µs. A user of the test device 205 may set other thresholds as desired. In this example, sync error between PCI#1 and PCI#3 are compared because they are in different clusters, and a determination is being made as to whether the clusters are out of sync. However, any of the measurements may be compared to one or more thresholds to determine whether the measurements are out of desired tolerances.

There are many systems that need a precise time synchronization to work properly. For example, base stations for mobile phones and power source monitoring systems depend on such time synchronization. Next Generation Fronthaul Interface (NGFI) time error requirements are shrinking. LTE Time Division Duplex (LTE-TDD) time error requirements for an example 3 kilometer (km) cell radius is on the order of +/−5 µs. 5G NR intra & inter-band non-contiguous carrier aggregation with LTE-TDD may require a time error on the order of +/−1.5 µs. Thresholds may be set based on 3GPP-stated time error requirements or may be set at even more stringent timing requirements as needed.

At 405, a GUI, such as shown in FIG. 3, is generated on a display of the test device 205 based on whether any of the sync errors are outside a threshold. For example, the sync error between PCI#1 and PCI#3 is greater than 3 µs, so clusters A and B are out of sync. Thus, the dot for this measurement location is shown in red. Additionally, the measurements are outlined in the table such as in a box as shown in FIG. 3, which may be color-coded. Also, base station information associated with the measurements is indicated as out of sync, such as shown in section 3.

In an example, the test device 205 stores geographic locations of overlapping cells for neighboring dusters. From the geographic locations of the overlapping cells for the dusters, the test device 205 determines a boundary zone, such as shown as SINR zone in FIG. 2. The boundary zone may have a predetermined shape and area. In an example, the boundary zone is a rectangle with a predetermined area. Locations of base stations in the boundary zone are shown, and an indication is provided if the clusters are out of sync.

The steps of the method 400 may be performed for multiple measurement locations, as represented by the dots in section 2 of the GUI shown in FIG. 3.

Figure 5:
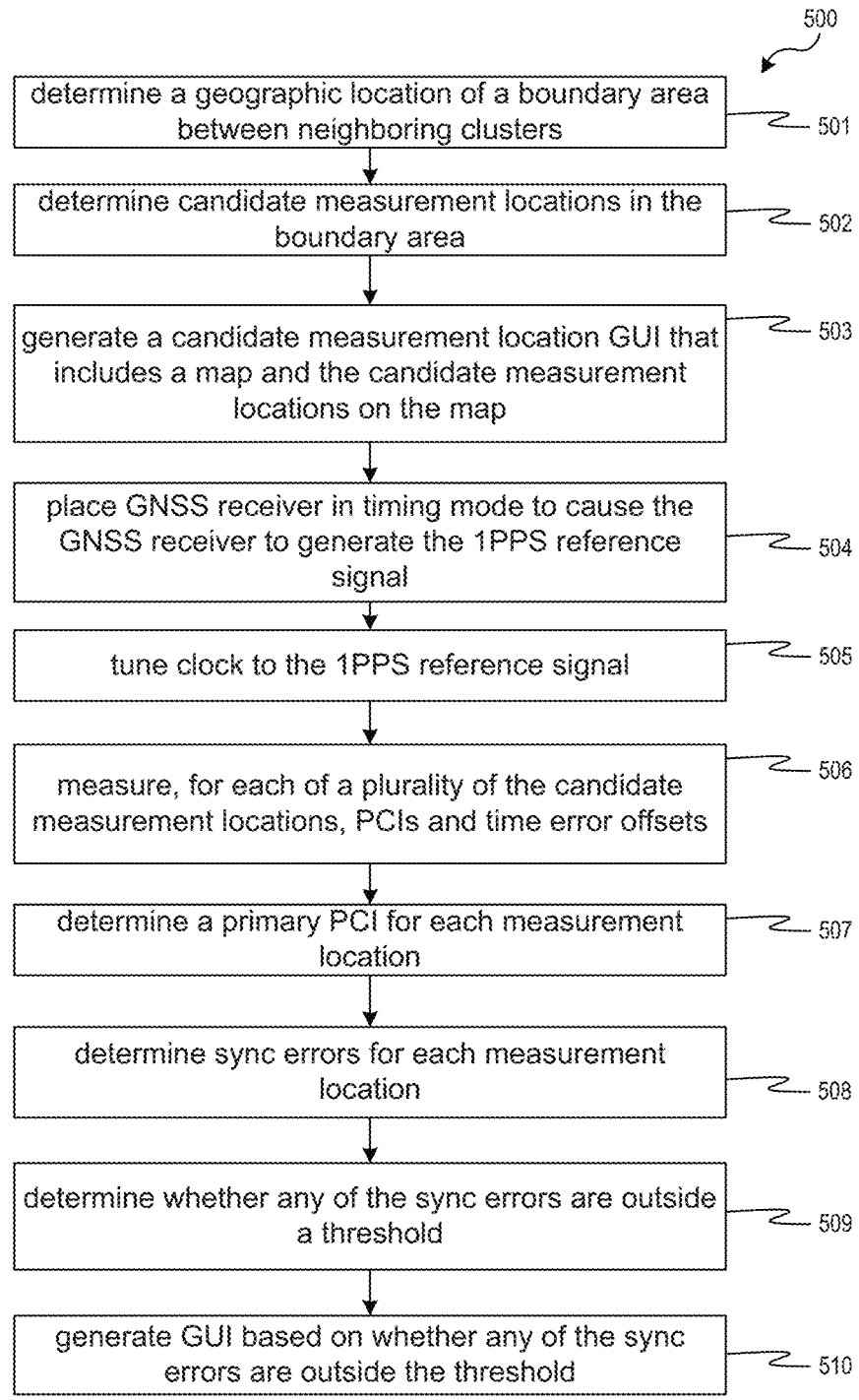

FIG. 5 shows an example flow chart of a method 500 that may be performed by the test device 205. The method 500 include steps of the method 400 performed for a plurality of measurement locations hi the boundary area between dusters.

At 501, the test device 205 determines a geographic location of a boundary area between neighboring dusters, such as clusters A and B. The boundary area is where cross-link interference between the neighboring clusters is operable to occur. In n example, the test device 205 stores geographic locations of overlapping cells for neighboring dusters. From the geographic locations of the overlapping cells for the dusters, the test device 205 determines a boundary zone, such as shown as SINK zone in FIG. 2. The boundary zone may have a predetermined shape and area. In an example, the boundary zone is a rectangle with a predetermined area. Locations of base stations in the boundary zone are shown, and an indication is provided if the clusters are out of sync.

At 502, the test device 205 determines candidate measurement locations in the boundary area. For example, the test device 205 determines a path through the boundary area that may be traversed by a user of the test device 205 and marks candidate measurement locations within predetermined distances along the path. The path may be based on roads and/or walkways that traverse the boundary zone or may be based on a line through the center of the boundary area that is superimposed over roads and/or walkways in the boundary area. In an example, the path may traverse a center of a rectangular-shaped boundary area along the length of the rectangle.

Figure 6:
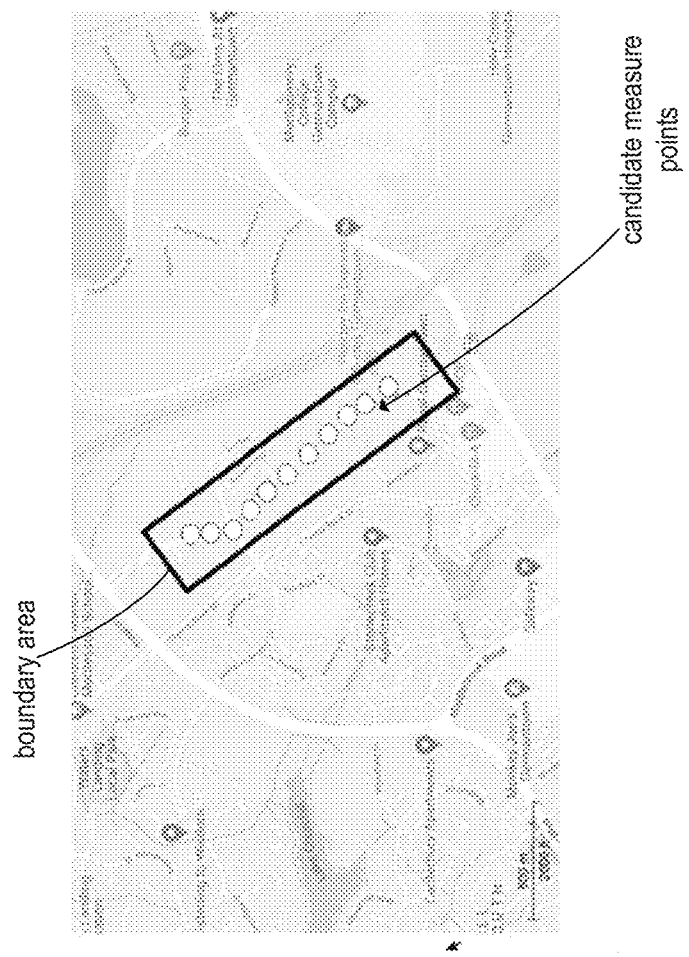
FIG. 6 is a graphic user interface generated by the test device, according to another example of the present disclosure.

At 503, the test device 205 generates a candidate measurement location GUI that includes a map and the candidate measurement locations on the map. FIG. 6 is an example of the candidate measurement location GUI. Although not shown, the candidate measurement location GUI may also include instructions or directions for getting to each candidate measurement location and instructions to perform the measurements at the candidate measurement locations. Then, the user/technician may decide at each candidate measurement location whether to take the measurements discussed above with respect to FIG. 4 using the test device 205, where the actual measurement locations and measurements for each location are stored in the test device 205.

At 504, the test device 205, which may include a GNSS receiver, places the GNSS receiver in timing mode to cause the GNSS receiver to generate the 1PPS reference signal.

At 505, the test device 205 tunes a clock, such as rubidium oscillator, of the test device 205 to the 1PPS reference signal so it outputs the 1PPS reference signal.

The remaining steps include steps of the method 400, but the steps are performed for ach of a plurality of the candidate measurement locations. At 506, the test device 205 measures, for each of a plurality of the candidate measurement locations, PCIs and time error offsets based on synchronization signals received from base stations of cells in the boundary zone. At 507, the test device 205 determines a primary PCI for each measurement location. At 508, the test device 205 determines the sync errors for each measurement location. At 509, the test device 205 determines whether any of the sync errors are outside a threshold. At 510, a GUI, such as shown in FIG. 3, is generated on a display of the test device 205 based on whether any of the sync errors are outside a threshold.

Figure 7:
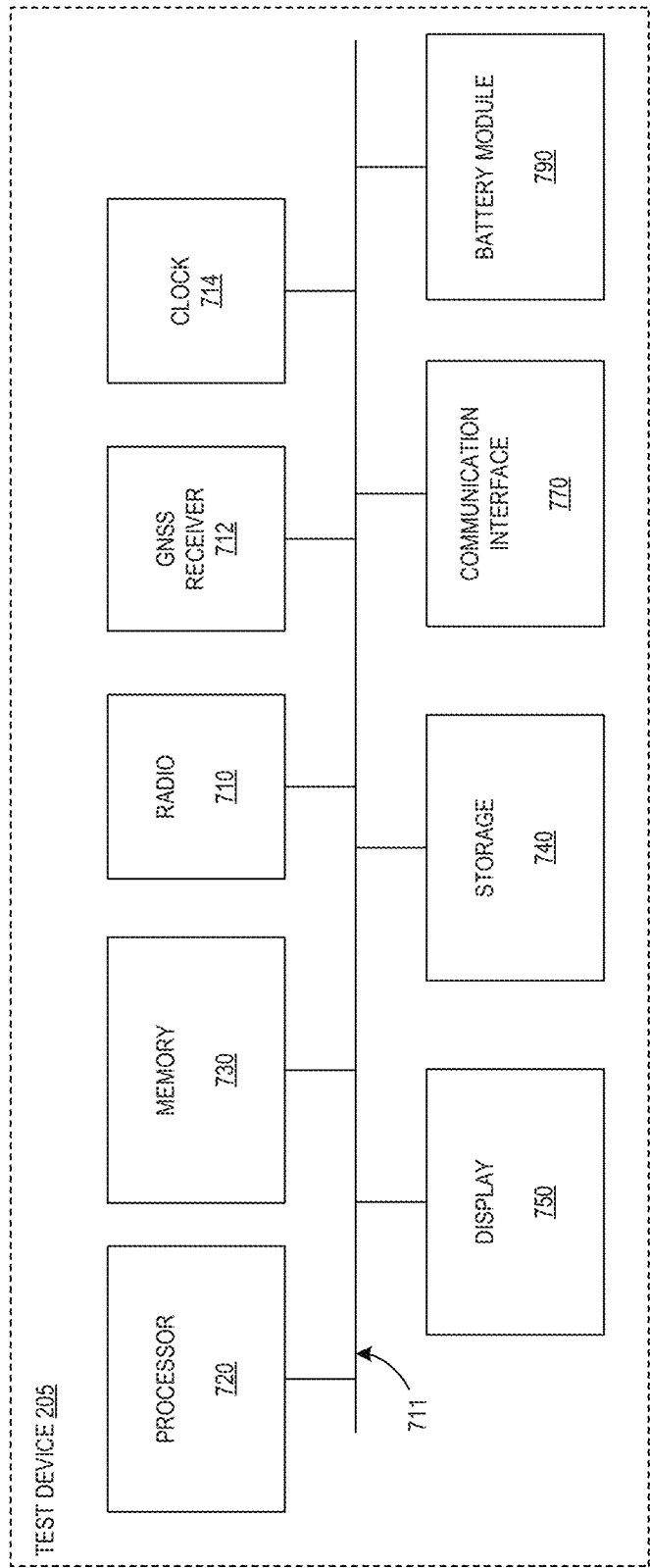
FIG. 7 illustrates a block diagram of the test device, according to an example of the present disclosure.

FIG. 7 is a diagram of components of the test device 205, according to an example of the present disclosure. Test device 205 may include a bus 711, a processor 720, a memory 730, a storage 740, a display 750, a communication interface 770, a battery module 790, a radio 710, a GNSS receiver 712, and a clock 714. The radio 710 is a wireless cellular communication interface that allows the test device 205 to communicate with base stations over the air. GNSS receiver 712 can receive GNSS signals from a GNSS satellite and generate the 1PPS reference signal based that may be synchronized to UTC. For example, the GNSS receiver 712 may be placed into timing mode to generate the 1PPS reference signal. Clock 714 may be a tunable rubidium clock that can be tuned to the 1PPS reference signal so it can reliably generate the 1PPS reference signal over time. The 1PPS reference signal output by the clock 714 may be used to determine frame starts and time errors such as discussed above with respect to FIG. 2.

Bus 711 includes a component that permits communication among the components of the test device 205. Processor 720 is implemented in hardware, firmware, software or a combination of such. Processor 720 may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC) and/or other types of processing circuits. In some examples, processor 720 includes one or more processors capable of being programmed to perform a function. Memory 730 may include one or more memories such as a random access memory (RAM), a read only memory (ROM), and/or another type of dynamic or static storage device (e.g., a flash memory, a magnetic memory, and/or an optical memory) that stores information and/or instructions for use by processor 720. Storage 740 stores information and/or software related to the operation and use of test device 205. For example, storage 740 may include a hard disk (e.g., a magnetic disk; an optical disk, a magneto-optic disk, and/or a solid state disk), a solid state drive, and/or another type of non-transitory computer-readable medium.

Display 750 includes a display that can show the GUIs described herein. The display 750 may be an input/output (I/O) device, such as a touchscreen display. The test device 205 may include other types of known I/O devices that permits test device 205 to receive and/or output information, e.g., a keyboard, a keypad, a mouse, a button, a switch, light-emitting diodes, and/or a microphone. Additionally, the test device may include a sensor for sensing information, e.g., a GPS component, an accelerometer, a gyroscope, and/or an actuator.

Communication interface 770 includes a transceiver-like component (e.g., a transceiver and/or a separate receiver and transmitter) that enables test device 205 to communicate with other devices, such as via a wired connection, a wireless connection, or a combination of wired and wireless connections. Communication interface 770 may permit test device 205 to receive information from another device and/or provide information to another device. For example, communication interface 770 may include an Ethernet interface, an optical interface, a coaxial interface, an infrared interface, an RF interface, a universal serial bus (USB) interface, a Wi-Fi interface, or the like.

Battery module 790 is connected along bus 711 to supply power to processor 720, memory 730, and internal components of test device 205. Battery module 790 may supply power during field measurements by test device 205. Battery module 790 permits test device 205 to be a portable integrated device for conducting field measurements. The test device 205 may be portable to permit the user to carry the test device 205 to different measurement locations.

Test device 205 may perform one or more processes described herein. Test device 205 may perform these processes by processor 720 executing software instructions stored by a non-transitory computer-readable medium, such as memory 730 and/or storage component 740. A computer-readable medium defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may instruct processor 720 to perform one or more processes described herein. Additionally, or alternatively, hardwired circuitry may be used in place of or in combination with software instructions to perform one or amore processes described herein. Thus, implementations described herein are not limited to any specific combination of hardware circuitry and software.

The number and arrangement of components shown in FIG. 7 are provided as an example. In practice, test device 205 may include additional components, fewer components, different components, or differently arranged components than those shown in FIG. 7. Additionally, or alternatively, a set of components (e.g., one or more components) of test device 205 may perform one or more functions described as being performed by another set of components of test device 205.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A test device operable to test timing synchronization between neighboring clusters in a cellular network, comprising:
   a power source;
   a display;
   a Global Navigation Satellite System (GNSS) receiver to:
      enter a timing mode to generate a one pulse per second (1PPS) reference signal based on GNSS signals received from a satellite;
   a clock tunable to the 1PPS reference signal;
   a radio to transmit and receive over the air signals;
   a processor to:
      measure physical cell identities (PCIS) and time error offsets based on synchronization signals received via the radio from a plurality of base stations in the neighboring clusters, wherein each time error offset is an offset between a start of a frame for a cell and the 1PPS reference signal;
determine a primary PCI from the PCIs;
calculate a sync error from differences between the time error offsets for the primary PCI and remaining PCIs of the PCIS;
determine whether the sync error is within a predetermined threshold; and
generate a graphical user interface (GUI) on the display based on whether the sync error is within the predetermined threshold;
wherein the GUI comprises
a map and a point on the map indicating a geographic measurement location of the test device when the PCIs and the time error offsets are measured;
a table showing the PCIS, the time error offsets, and the sync error; and
an indicator in at least one of the table and the map that indicates whether the sync error is within the predetermined threshold.

2. The test device of claim 1, wherein the GUI further comprises cells of the neighboring dusters, a predetermined boundary area between the neighboring dusters, locations of the plurality of base stations in the predetermined boundary area; and an indication of whether the neighboring dusters are out of synchronization based on the sync error.

3. The test device of claim 2, wherein the processor is to:
determine a geographic location of the predetermined boundary area between the neighboring clusters; and
determine a plurality of candidate measurement locations in the predetermined boundary area where signal interference between the neighboring dusters is operable to occur;
generate a candidate measurement location GUI including the map and the candidate measurement locations on the map and instructions guiding a user of the test device to take measurements at one or more of the candidate measurement locations.

4. The test device of claim 3, wherein the candidate measurement locations are on a path between the neighboring clusters that is operable to be traversed by the user while taking measurements with the test device at a plurality of the candidate measurement locations.

5. The test device of claim 1, wherein to measure the time error offsets, the processor is to:
determine, from information in the synchronization signals, a frame start each cell identified by the PCIS; and
determine a time difference between a time of a rising edge or a falling edge of the 1PPS reference signal and the frame start for each cell.

6. The test device of claim 5, wherein to determine the frame start for each cell, the processor is to:
determine a distance between the measurement location of the test device where the test device measures the PCIS and the time error offsets and each base station of the plurality base stations; and
adjust the frame start for each cell based on a propagation time of an over the air signal transmitted from each base station to the test device at the measurement location, wherein the propagation time of the signal transmitted from each base station is determined from the determined distance from each base station to the measurement location.

7. The test device of claim 1, wherein the processor is to:
determine measurements for received signal power, received signal quality and signal-to-noise and interference ratio based on the synchronization signals received from the plurality of base stations in the neighboring clusters; and
display the measurements for the received signal power, the received signal quality and the signal-to-noise and interference ratio in the table.

8. A test device operable to test timing synchronization between neighboring clusters in a cellular network, comprising:
a power source;
a data storage;
a display;
a Global Navigation Satellite System (GNSS) receiver to:
enter a timing mode to generate a one pulse per second (1PPS) reference signal based on G1PPS reference signal;
a radio to transmit and receive over the air signals;
a processor to:
measure, for each of a plurality of measurement locations within a predetermined boundary area between the neighboring dusters, physical cell identities (PCIs) and time error offsets based on synchronization signals received via the radio from a plurality of base stations in neighboring dusters at each measurement location,
wherein each time error offset is an offset between a start of a frame for a cell and the 1PPS reference signal;
store the measured PCIs and time error offsets for each measurement location in the data storage;
determine a primary PCI from the PCIs for the measurement locations;
calculate a sync error fro differences between the time error offsets for the primary PCI and remaining PCIs of the PCIs for each measurement location;
determine whether the sync error is within a predetermined threshold for each measurement location; and
generate a graphical user interface (GUI) on the display based on whether the sync error is within the predetermined threshold for each measurement location,
wherein the GUI comprises:
a map and a point on the map for each measurement location;
a table showing the PCIS, the time error offsets, and the sync error for each measurement location; and
an indicator in at least one of the table and the map that indicates whether the sync error is within the predetermined threshold for each measurement location.

9. The test device of claim 8, wherein the GUI further comprises cells of the neighboring clusters, the predetermined boundary area between the neighboring clusters, locations of the plurality of base stations in the predetermined boundary area; and an indication of whether the neighboring clusters are out of synchronization based on at least one of the sync errors determined for the measurement locations.

10. The test device of claim 8, wherein the processor is to;
determine a geographic location of the predetermined boundary area between the neighboring clusters;
determine a plurality of candidate measurement locations in the predetermined boundary area where signal interference between the neighboring clusters is operable to occur; and generate a candidate measurement location GUI including the map and the candidate measurement locations on the map and instructions guiding a user of the test device to take measurements at one or more of the candidate measurement locations.

11. The test device of claim 10, wherein the candidate measurement locations are on a path between the neighboring clusters that is operable to be traversed by the user while taking measurements with the test device at a plurality of the candidate measurement locations.

12. The test device of claim 8, wherein to measure the time error offsets, the processor is to:
determine, from information in the synchronization signals, a frame start for each cell identified by the PCIS; and
determine a time difference between a time of a rising edge or a falling edge of the 1PPS reference signal and the frame start for each cell.

13. The test device of claim 8, wherein to determine the primary PCI, the processor is to determine which base station has a greatest signal strength based on the synchronization signals.

14. The test device of claim 8, wherein the processor is to:
determine measurements for received signal power, received signal quality and signal-to-noise and interference ratio based on the synchronization signals received from the plurality of base stations in the neighboring clusters; and
display the measurements for the received signal power, the received signal quality and the signal-to-noise and interference ratio in the table.

15. A method to test timing synchronization between neighboring clusters in a cellular network performed by a portable testing device, the method comprising:
enter a Global Navigation Satellite System (GNSS) receiver of the test device into timing mode to generate a one pulse per second (1PPS) reference signal based on GNSS signals received from a satellite;
tuning a clock of the test device to the 1PPS reference signal;
measuring, for each of a plurality of measurement locations within a predetermined boundary area between the neighboring clusters, physical cell identities (PCIs) and time error offsets based on synchronization signals received from a plurality of base stations in neighboring clusters at each measurement location,
wherein each time error offset is an offset between a start of a frame for a cell and the 1PPS reference signal;
determining a primary PCI from the PCIS for the measurement locations;
calculating a sync error from differences between the time error offsets for the primary PCI and remaining PCIs of the PCIS for each measurement location;

determining whether the sync error is within a predetermined threshold for each measurement location; and
generating a graphical user interface (GUI) on a display of the test device based on whether the sync error is within the predetermined threshold for each measurement location,
wherein the GUI comprises:
a map and a point on the map for each measurement location;
a table showing the PCIs, the time error offsets, and the sync error for each measurement location; and
an indicator in at least one of the table and the map that indicates whether the sync error is within the predetermined threshold for each measurement location.

16. The method of claim 15, wherein the GUI further comprises cells of the neighboring clusters, the predetermined boundary area between the neighboring clusters, locations of the plurality of base stations in the predetermined boundary area, and an indication of whether the neighboring clusters are out of synchronization based on at least one of the sync errors determined for the measurement locations.

17. The method of claim 15, comprising:
determining a geographic location of the predetermined boundary area between the neighboring clusters;
determining a plurality of candidate measurement locations in the predetermined boundary area where signal interference between the neighboring clusters is operable to occur; and
generating a candidate measurement location GUI including the map and the candidate measurement locations on the map and instructions guiding a user of the test device to take measurements at one or more of the candidate measurement locations.

18. The method of claim 17, wherein the candidate measurement locations are on a path between the neighboring clusters that is operable to be traversed by the user while taking measurements with the test device at a plurality of the candidate measurement locations.

19. The method of claim 15, wherein measuring the time error offsets for each of the plurality of measurement locations comprises:
determining, from information in the synchronization signals, a frame start for each cell identified by the PCIs; and
determining a time difference between a time of a rising edge or a falling edge of the 1PPS reference signal and the frame start for each cell.

20. The method of claim 15, wherein determining the primary PCI for each measurement location comprises:
determining which base station has a greatest signal strength based on the synchronization signals.

* * * * *